Patented July 26, 1949

2,477,554

UNITED STATES PATENT OFFICE 2,477,554

PROCESS OF PREPARING COBALT CARBONYL

Charles H. McKeever, Glenside, Pa., assignor to Rohm & Haas Company, Philadelphia, Pa., a corporation of Delaware No Drawing. Application September 11, 1948, Serial No. 48,927

5 Claims. (Cl. 23—203)

This invention relates to new and useful improvements in the manufacture of cobalt carbonyl. More particularly, it relates to a process wherein cobalt salts of organic acids are dissolved in inert organic solvents and are converted therein to cobalt carbonyl by reaction with carbon monoxide under heat and pressure.

It has been known heretofore to prepare cobalt tetracarbonyl by the reaction of cobalt metal and carbon monoxide. Such a process, however, requires first the preparation of cobalt metal in a finely divided, activated form, and it yields the carbonyl in the solid form, which is relatively unstable and is difficult to handle and transport.

One process for overcoming these difficulties is shown in one of my earlier applications, Serial No. 787,615, filed November 22, 1947. By that process, an inorganic cobalt compound is suspended in a neutral, inert, organic liquid and is reacted, while suspended, with carbon monoxide.

The present invention represents a still greater improvement and comprises dissolving a toluene-soluble cobalt salt of an organic acid in an inert solvent, preferably a hydrocarbon solvent which is free of aliphatic or non-benzenoid carbon-to-carbon unsaturation, and reacting said dissolved cobalt salt with carbon monoxide at temperatures above about 80° C. and under superatmospheric pressure.

The first critical requirement of the cobalt salts which are employed in this invention is that they be soluble in toluene and, being soluble in toluene, they may be readily treated therein with carbon monoxide. Also, toluene-soluble salts are soluble in other solvents such as benzene, V. M. & P. naphtha, petroleum ether, kerosene, mineral spirits, ketones, and the like.

The second requirement is that the acid radical of the toluene-soluble cobalt salts be free of aliphatic, acyclic, alicyclic, or non-benzenoid carbon-to-carbon unsaturation. That is, the cobalt salts must not have double or triple bonds between carbon atoms in the aliphatic or non-benzenoid portions thereof, because compounds having such aliphatic unsaturation react at the points of unsaturation, that is, at the double or triple bonds, with carbon monoxide in the presence of cobalt carbonyl and any hydrogen which may be present. Unsaturation of the aromatic or benzenoid type is not objectionable; that is, the presence of any double bonds in aromatic rings, such as the benzene or naphthalene rings, is not detrimental because these points of unsaturation are not points of reactivity as are points of carbon-to-carbon unsaturation in aliphatic, acyclic, alicyclic, or non-benzenoid portions of the cobalt compounds.

A third requirement is that the acid radical of the cobalt salt contain only carbon, hydrogen, and oxygen atoms. This permits the presence of such groups as hydroxy, ether, keto, and aldehydo groups in the acid radical of the salt while excluding other substituents, such as the amino groups, which interfere with the preparation of the cobalt carbonyl.

The preferred class of cobalt salts which may be employed is the toluene-soluble salts of the organic acids which are represented by the general formula, RCOOH, in which formula R represents a hydrocarbon group which is free of non-benzenoid unsaturation and which contains six to twenty-two carbon atoms. Suitable cobalt salts of this kind are typified by those of the following acids: Caproic, caprylic, capric, lauric, myristic, palmitic, margaric, stearic, arachidic, behenic, phenylacetic, β-phenylpropionic, biphenylacetic, p-tert-butylphenylacetic, p-ethylphenylpropionic, naphthenic acids, and the like. In the case of aliphatic acids, the hydrocarbon portion, represented by R in the above general formula, may be a straight- or a branched-chain group such as an n-octyl, iso-octyl, ditertiary butyl, or 2-ethylhexyl group. Thus, the cobalt salts of mixtures of acids, particularly of mixtures of isomeric acids, can be used. The arrangement of the carbon atoms in the acid is not critical.

Another class of suitable toluene-soluble cobalt salts is made up of those keto-benzoic acids which are shown in United States Patents Nos. 1,880,759 and 1,939,621 to Bruson. These acids have the general formula

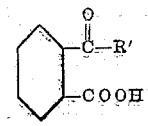

in which R' is a saturated hydrocarbon radical from the class consisting of alkyl, aryl, and alkaryl radicals. These acids are typified by p-ethylbenzoyl-o-benzoic acid, butyryl-benzoic acid, tetrahydronaphthoyl-o-benzoic acid, and the like.

The cobalt salts shown in United States Patent No. 1,933,520 to Bruson are also operable in the process of this invention. These are the toluene-soluble cobalt salts of acids, particularly the alkylated salicylic acids having the general formula

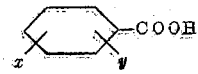

in which $x$ is a hydroxy, alkoxy, or aryloxy group and $y$ is an alkyl group. United States Patent No. 1,962,478 to Bruson et al. further discloses other cobalt salts which meet the requirements of this invention. Such, for example, are the cobalt salts of keto-acids having the general formula

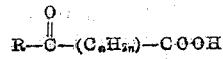

wherein R is an aromatic hydrocarbon radical and n is a whole number from two to eight, inclusive. Cobalt salts of ether acids, such as those having the general formula $$R-O-C_nH_{2n}-COOH$$

in which n is a whole number and R is a saturated hydrocarbon radical, can also be employed in this invention. Suitable ether acids are shown in United States Patents Nos. 2,063,838 and 1,969,709 to Bruson et al. and in 2,044,968 to Bruson.

The cobalt salts are not limited to those which have been shown by way of example but include others which meet the requirements set forth above.

In preparing the solutions of cobalt salts which are subsequently converted to cobalt carbonyl, a wide variety of solvents can be used provided that they, too, meet the requirements as to composition which were discussed above in connection with the acidic radical of the cobalt salt. Thus, the solvents must be free of aliphatic or non-benzenoid unsaturation, lest they react with carbon monoxide. And they must be composed entirely of carbon, oxygen, and hydrogen. The solvents must be inert—and the word "inert" is used in the accepted and recognized sense to indicate that the liquid does not undergo chemical reaction with the reactants employed to produce the cobalt carbonyl or with cobalt carbonyl itself. Hydrocarbons, aliphatic and aromatic, are much the preferred solvents because of their low cost and chemical inertness. Thus, benzene, toluene, V. M. & P. naphtha, isooctane, heptane, cyclohexane, and the like, together with mixtures thereof, are recommended. Ketones, ethers, esters, and aldehydes can likewise be used, if desired. While saturated hydrocarbons are ideal liquids from the standpoint of inertness and availability, they do not hold in solution so much cobalt carbonyl as these other liquids and, therefore, it is often advantageous to use a mixture of a hydrocarbon and another of the above liquids, particularly a higher ketone, such as methyl hexyl ketone. Suitable inert liquids which can be used alone or preferably together with inert hydrocarbons are exemplified by the following: ketones, such as acetone, diethyl ketone, methyl ethyl ketone, diisopropyl ketone, methyl isobutyl ketone, acetophenone, diphenyl ketone; alcohols, such as methyl, ethyl, isopropyl, isobutyl, tertiary-butyl, isononyl, isoheptyl, benzyl, and dodecyl alcohols; esters, such as ethyl acetate, isobutyl acetate, tert.-amyl propionate, methyl formate, benzyl acetate, and isobutyl benzoate; ethers, such as diethyl ether, dibutyl ether, diisobutyl ether, dioxan, and diphenyl ether; aldehydes, such as heptaldehyde, butyraldehyde, propionaldehyde, isobutyraldehyde, isoamylaldehyde, laurylaldehyde, isononylaldehyde, and benzaldehyde.

In preparing cobalt carbonyl by the process of this invention, the organic solution of the cobalt salt is charged to a reaction vessel and reacted therein with carbon monoxide at elevated temperatures and superatmospheric pressures. While the process is independent of details in equipment, it has been found that fast and high conversion of the initial cobalt salt is effected when the reaction is carried out in a shaking bomb or autoclave charged with the solution of cobalt salt and carbon monoxide under pressure. The course of the reaction can be followed readily, in this case, by the fall in pressure as the carbon monoxide reacts to form the carbonyl. Alternatively, this invention may be carried out continuously, for example, by dropping or spraying the solution of cobalt salt into a reaction vessel while carbon monoxide is also admitted continuously. A very convenient process involves spraying the solution into a pressure chamber while carbon monoxide is passed through the chamber countercurrently. In such a case, compressed carbon monoxide may be used to spray the suspension of cobalt compound. A distinct advantage of the process of this invention is that it employs solutions of cobalt compounds which can be pumped or handled in continuous operation far more readily and conveniently than solid cobalt compounds or suspensions and slurries thereof.

While carbon monoxide can be employed alone, it is preferred that it be diluted with hydrogen. The presence of hydrogen not only accelerates the rate at which cobalt carbonyl is produced but it also makes for a higher yield of the latter. The ratio of carbon monoxide to hydrogen can be widely varied. Amounts of hydrogen from one quarter to four times the amount of carbon monoxide can be used, although it is preferred to use from one half to two times the amount of carbon monoxide.

In preparing the solution of cobalt salt, the ratio of soluble salt to solvent can be varied widely within reasonable limits. Sufficient solvent should be used to provide a free-flowing solution which can be poured or pumped conveniently. In general, as the concentration of the solution of cobalt carbonyl approaches saturation, the rate of formation decreases. Also, the best yields of carbonyl are obtained in liquids which are the best solvents therefor, all other factors being constant. Since solutions containing 8% to 12% of cobalt carbonyl can be readily handled, it is preferred to use such amounts of solvent as will yield such solutions.

It is well known that cobalt carbonyl can be prepared over a wide range of temperature and pressure. The same conditions can be employed in the process of this invention. Thus, temperatures above 300° C. can be used although, from a practical and economical standpoint, temperatures from 80° C. to 200° C. are preferred. In the absence of a promoter, which is discussed below, the minimum temperature becomes about 140° C.

Pressures as low as one hundred fifty pounds per square inch and as high as ten thousand pounds per square inch have been used. In fact, pressures above ten thousand pounds are not inoperative, but their use gives rise to practical difficulties while those below five hundred pounds result in lower yields. For this reason, pressures from five hundred to five thousand pounds per square inch are much preferred.

It has been found, and described in my application Serial No. 787,616, that the presence of pre-formed cobalt carbonyl dissolved in the organic solvent reduces the induction period of the reaction between carbon monoxide and cobalt compounds and accelerates the rate of reaction. It is within the scope of this invention to employ pre-formed cobalt carbonyl in this way. A minimum amount of pre-formed cobalt carbonyl equal to 0.25% of the dissolved cobalt salt should be used. The maximum amount is not critical, since the process is one of producing more cobalt carbonyl. Actually, there is no advantage in using more than 10% of promoter on the same basis, and an upper limit of 6% is preferred for reasons of economy.

The following examples illustrate this invention.

Example 1

Fifty milliliters of a solution of cobalt dinonanoate in four parts of benzene and one part of methyl ethyl ketone, and containing an equivalent of 3% of cobalt metal by weight, was placed in a rocking autoclave. Two milliliters of a 6% solution of cobalt carbonyl in methyl ethyl ketone was added. The autoclave was closed, flushed with carbon monoxide, and then charged to 2600 pounds' pressure with an equal mixture of carbon monoxide and hydrogen. Shaking was started and heat applied. By the time the temperature had reached 120° C., absorption of gas had started. At 120°–125° C., absorption was rapid, and in less than ten minutes five to five and one-half moles of gas per mole of cobalt had been consumed. Thereafter, for a period of twenty minutes, no more gas was taken up and, at this point, the autoclave was cooled and vented and a dark-brown, clear solution of cobalt carbonyl was discharged. The conversion of the cobalt dinonanoate was quantitative.

Example 2

In a similar manner, a quantitative yield of cobalt carbonyl was obtained by the reaction of carbon monoxide and cobalt naphthenate, the latter being dissolved in a mixture of one part of methyl ethyl ketone and four parts of toluene in an amount equivalent to 3% of cobalt metal.

Example 3

Three hundred milliliters of a solution composed of cobalt di-2-ethylhexoate dissolved in six parts of benzene and one part of methyl ethyl ketone, and containing the equivalent of 2.5% of cobalt metal, was charged to a high-pressure tubular reactor equipped with a gas inlet at the bottom. Ten milliliters of a 6% cobalt carbonyl solution in methyl ethyl ketone was added. The reactor was closed. A gas containing equal parts of carbon monoxide and hydrogen was bubbled through the reaction mixture at a slow rate, the pressure being gradually brought up to three thousand pounds. At the same time, heat was applied at such a rate that a temperature of 130° C. was reached at about the same time as the pressure reached three thousand pounds. This enabled an even gas flow through the system. The pressure was maintained at three thousand pounds, and a small amount of gas was continually vented. About two minutes after the temperature of 130° C. had been reached the gas absorption, as measured by the drop in pressure in a high-pressure reservoir, became very rapid until five moles of gas per mole of cobalt was consumed. The gas was bubbled through the solution for thirty minutes more, although there was no noticeable consumption after the five moles had been consumed. The reactor was cooled, vented, and the contents discharged. The conversion of cobalt di-2-ethylhexoate to cobalt carbonyl was quantitative.

The accelerating effect of the presence of the preformed cobalt carbonyl is evident from the fact that when Example 3 was repeated with one change, namely, the omittance of the preformed cobalt carbonyl promoter, the yield of cobalt carbonyl was only about 35% after three hours of heating at 130° C.

I claim:

1. A process for the preparation of cobalt carbonyl which comprises dissolving a toluene-soluble cobalt salt of an organic acid, the organic radical of which salt is free of non-benzenoid unsaturation and contains only carbon, hydrogen, and oxygen atoms, in an inert organic liquid, which also is free of non-benzenoid unsaturation and contains only carbon, hydrogen, and oxygen atoms, and reacting said dissolved cobalt salt with carbon monoxide at a temperature above 80° C. and under superatmospheric pressure.

2. A process for the preparation of cobalt carbonyl which comprises dissolving a toluene-soluble cobalt salt of an organic acid, which acid has the general formula RCOOH, in which R is a hydrocarbon group of six to twenty-two carbon atoms and which is free of non-benzenoid unsaturation, in an inert organic liquid, which also is free of non-benzenoid unsaturation and contains only carbon, hydrogen, and oxygen atoms, and reacting said dissolved cobalt salt with carbon monoxide at a temperature above 80° C. and under superatmospheric pressure.

3. A process for the preparation of cobalt carbonyl which comprises dissolving a toluene-soluble cobalt salt of an organic acid, the organic radical of which salt is free of non-benzenoid unsaturation and contains only carbon, hydrogen, and oxygen atoms, in an inert organic liquid, which also is free of non-benzenoid unsaturation and contains only carbon, hydrogen, and oxygen atoms, and reacting said dissolved cobalt salt with carbon monoxide at a temperature of 80° C. to 300° C. and under a pressure of five hundred to five thousand pounds per square inch.

4. A process for the preparation of cobalt carbonyl which comprises dissolving a toluene-soluble cobalt salt of an organic acid, which acid has the general formula RCOOH, in which R is a hydrocarbon group of six to twenty-two carbon atoms and which is free of non-benzenoid unsaturation, in an inert organic liquid, which also is free of non-benzenoid unsaturation and contains only carbon, hydrogen, and oxygen atoms, and reacting said dissolved cobalt salt with carbon monoxide at a temperature of 80° C. to 300° C. and under a pressure of five hundred to five thousand pounds per square inch.

5. A process for the preparation of cobalt carbonyl which comprises dissolving a toluene-soluble cobalt salt of an organic acid, the organic radical of which salt is free of non-benzenoid unsaturation and contains only carbon, hydrogen, and oxygen atoms, in an inert organic liquid, which also is free of non-benzenoid unsaturation and contains only carbon, hydrogen, and oxygen atoms, and reacting said dissolved cobalt salt with carbon monoxide at a temperature above 80° C. and under superatmospheric pressure and in the presence of 0.25% to 10% of pre-formed cobalt carbonyl based on the weight of said cobalt salt.

CHARLES H. McKEEVER.

No references cited.